US009317520B2

(12) United States Patent
Howard et al.

(10) Patent No.: US 9,317,520 B2
(45) Date of Patent: Apr. 19, 2016

(54) STATE SCOPE DATA FILE SHARING

(71) Applicant: INTERNATIONAL BUSINESS MACHINES CORPORATION, Armonk, NY (US)

(72) Inventors: Curtiss J. Howard, Cary, NC (US); Todd E. Kaplinger, Raleigh, NC (US); William A. Nagy, New York, NY (US)

(73) Assignee: International Business Machines Corporation, Armonk, NY (US)

(*) Notice: Subject to any disclaimer, the term of this patent is extended or adjusted under 35 U.S.C. 154(b) by 226 days.

(21) Appl. No.: 13/954,441

(22) Filed: Jul. 30, 2013

(65) Prior Publication Data
US 2015/0039557 A1 Feb. 5, 2015

(51) Int. Cl.
G06F 17/30 (2006.01)

(52) U.S. Cl.
CPC ............................ G06F 17/30174 (2013.01)

(58) Field of Classification Search
None
See application file for complete search history.

(56) References Cited

U.S. PATENT DOCUMENTS

| 7,937,589 | B2 | 5/2011 | Oswald et al. | |
|---|---|---|---|---|
| 8,996,457 | B2* | 3/2015 | Sachs et al. | 707/613 |
| 2005/0080804 | A1 | 4/2005 | Bradshaw, Jr. et al. | |
| 2006/0085594 | A1 | 4/2006 | Roberson et al. | |
| 2006/0143412 | A1 | 6/2006 | Armangau | |
| 2007/0101326 | A1 | 5/2007 | Cai et al. | |
| 2008/0005164 | A1 | 1/2008 | Yee et al. | |
| 2008/0301228 | A1 | 12/2008 | Flavin | |
| 2009/0112779 | A1 | 4/2009 | Wolf et al. | |
| 2010/0305997 | A1 | 12/2010 | Ananian et al. | |
| 2011/0113210 | A1 | 5/2011 | Klapman et al. | |
| 2012/0030678 | A1 | 2/2012 | Hayduchok et al. | |
| 2012/0185500 | A1 | 7/2012 | Bhogal et al. | |
| 2012/0222026 | A1 | 8/2012 | Excoffier et al. | |
| 2012/0239621 | A1 | 9/2012 | Savenok et al. | |
| 2012/0278344 | A1 | 11/2012 | Berg et al. | |
| 2013/0066832 | A1 | 3/2013 | Sheehan et al. | |
| 2013/0212161 | A1* | 8/2013 | Ben-Shaul et al. | 709/203 |
| 2014/0229438 | A1* | 8/2014 | Carriero et al. | 707/625 |

FOREIGN PATENT DOCUMENTS

WO    2007128687 A1    11/2007

OTHER PUBLICATIONS

Wang et al.; "On the Impact of Virtualization on Dropbox-Like Cloud File Storage/Synchronization Services", IWQoS IEEE International Workshop on, Jun. 4-5, 2012, pp. 1-9.
R. Liu et al.; "Sharing of Recently Accessed Content "Recent Stuff" In Social Networking Environments", ip.com, IPCOM000223713D, Nov. 26, 2012, pp. 1-5.

(Continued)

Primary Examiner — Albert Phillips, III
(74) Attorney, Agent, or Firm — Law Office of Jim Boice

(57) ABSTRACT

A method, computer system, and/or computer program product shares state scope data among client devices in a cloud-based file synchronization service, where the client devices are intermittently connected to the cloud-based file synchronization service. In response to a first client device requesting a current version of shared state scope data from a second client device, the cloud-based file synchronization service transmits a request to the second client device for the updated shared state scope data. The updated shared state scope data is stored in the cloud-based file synchronization service, and then transmitted to the first client device.

2 Claims, 2 Drawing Sheets

(56) References Cited

OTHER PUBLICATIONS

Jonathan Beri et al., "App Data" Last Edited on Jan. 4, 2011, Opensocial Wiki, Opensocial, Retrieved Jul. 30, 2013, pp. 1-18.
Anonymous, "About Dropbox", dropbox.com, Retrieved Jul. 30, 2013, pp. 1.
U.S. Appl. No. 13/903,130, filed May 28, 2013—Specification, 26 pages.
U.S. Appl. No. 13/904,217, filed May 29, 2013—Specification, 25 pages.
U.S. Appl. No. 13/903,174, filed May 28, 2013—Specification, 25 pages.
U.S. Appl. No. 13/904,248, filed May 29, 2013—Specification, 25 pages.

* cited by examiner

STATE SCOPE DATA FILE SHARING

BACKGROUND

The present disclosure relates to the field of computers, and specifically to computers that store state scope files. Still more particularly, the present disclosure relates to synchronizing state scope files between computers.

In normal state scope data file sharing, the state scope changes are routed through a shared state server and then broadcast to applicable clients, allowing all applicable clients to process the same state scope data file. However, in a mobile environment, devices may become disconnected from the server, thus preventing synchronization of state scope data.

SUMMARY

A method and/or computer system shares state scope data among client devices in a cloud-based file synchronization service, where the client devices are intermittently connected to the cloud-based file synchronization service. In response to a first client device requesting a current version of shared state scope data from a second client device, the cloud-based file synchronization service transmits a request to the second client device for the updated shared state scope data. The updated shared state scope data is stored in the cloud-based file synchronization service, and then transmitted to the first client device.

DETAILED DESCRIPTION

Figure 1:
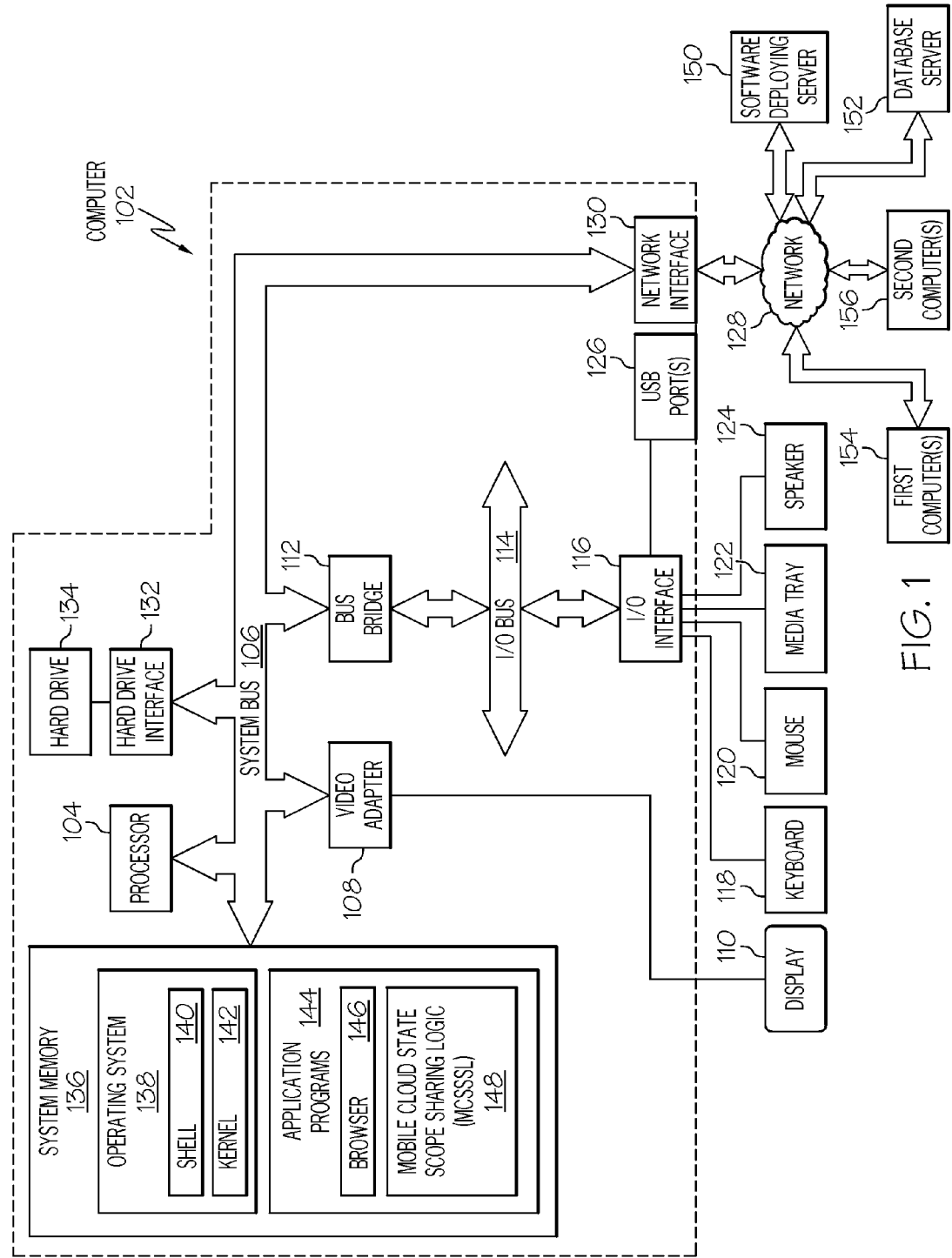
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, database server 152, first computer(s) 154 and/or second computer(s) 156.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, a database server 152, first computer(s) 154, and/or second computer(s) 156 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a mobile cloud state scope sharing logic (MCSSSL) 148. MCSSSL 148 includes code for implementing the processes described below, including those described in FIG. 2. In one embodiment, computer 102 is able to download MCSSSL 148 from software deploying server 150, including in an on-demand basis, such that the code from MCSSSL 148 is not downloaded until runtime or otherwise immediately needed by computer 102. Note further that, in one embodiment of the present disclosure, software deploying server 150 performs all of the functions associated with the present disclosure (including execution of MCSSSL 148), thus freeing computer 102 from having to use its own internal computing resources to execute MCSSSL 148.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
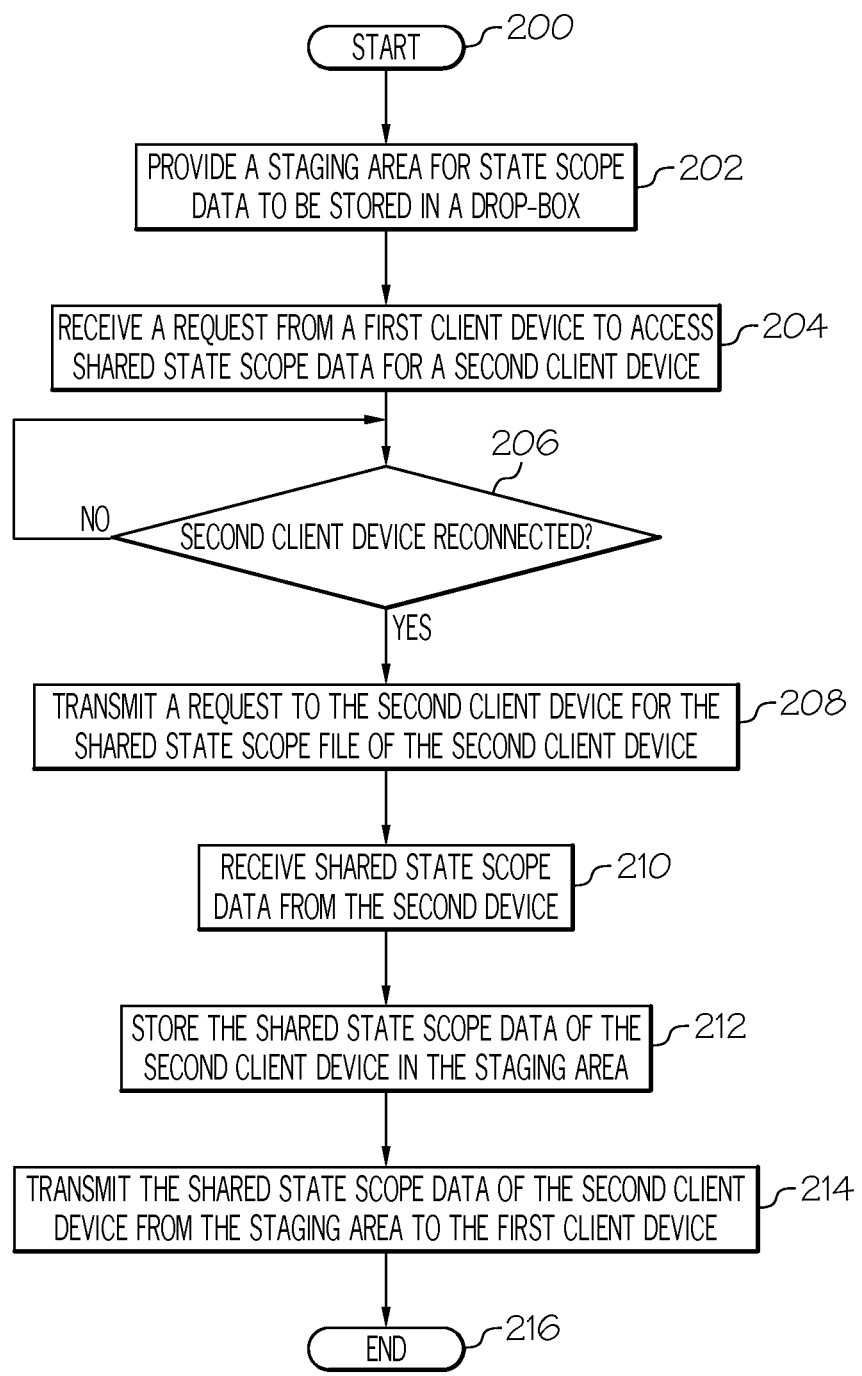
FIG. 2 is a high level flow chart of one or more exemplary steps taken by one or more processors to share state scope data among multiple devices.

With reference now to FIG. 2, a high level flow chart of one or more steps taken by one or more processors for sharing state information between clients is presented. After initiator block 200, a staging area for a state scope data store is provided within a cloud-based file synchronization service. In one embodiment, the cloud-based file synchronization service is known as a "drop box", which allows multiple client devices to access a same storage file on a network. The state scope data store resides within the cloud-based file synchronization service that supports storage of a shared state scope data file of a first client device and a second client device. In one embodiment, the shared state scope data file describes data entries into a shared application that is running on both the first client device and the second client device. A shared state scope data file is data (e.g., map, database) that resides in the cloud-based file synchronization service, the client devices and/or on a server that supports the cloud-based file synchronization service and the client devices. A data store in the cloud-based file synchronization service stores state information and includes rules directed to defining the type of state information (e.g., user-wide state information, device-wide state information, application-specific state information) stored within the data store as well as rules directed to defining the lifecycle of the state information (e.g., duration of time that the state information is valid). The state information stored in these shared state scopes can be shared among multiple instances of an application residing on multiple client devices.

Note that in one embodiment, the staging area is partitioned to segregate state scope data that is device-specific from state scope data that is application-specific. That is, state scope data that is device-specific is data that describes a state of a device, such as a particular device's configuration, attached resources, hibernation/power state, etc. State scope data that is application-specific describes a state of a particular application, such as what data has been entered into or for use by the particular application, whether the particular application is currently minimized on a user interface, etc.

In one embodiment, the first client device and the second client device are intermittently connected to and disconnected from the cloud-based file synchronization service. Thus, a change to a state scope data on one of the devices may or may not appear within the cloud-based file synchronization service (and particularly the staging area) if a device is disconnected from the cloud-based file synchronization service during the change. In one embodiment, one or both of the first and second client devices are mobile devices. Exemplary mobile devices include, but are not limited to, "smart" cell phones, tablet computers, or any other mobile computing devices. Note that mobile devices have a higher probability of lost connectivity than a traditional client server, which in one embodiment is assumed to be always connected.

In one embodiment, the partitioning of the staging area defines what type of device and/or application-running device may be accessed by a particular mobile device. For example, a user may wish to only communicate with (and thus be synchronized with) a device that is running a particular program. By permitting only devices that are running this particular program to access a particular partition in the staging area, then only updates related to that particular program will be shared among the different client devices.

With reference now to block 204 of FIG. 2, a request is received from the first client device to access the shared state scope data file from the cloud-based file synchronization service. In one embodiment, the second client device is disconnected from the cloud-based file synchronization service when the request is received, and thus the shared state scope data file may be out of date.

As described above, the second client device is disconnected from the cloud-based file synchronization service when the request from the first client device arrives at the cloud-based file synchronization service. Thus, as described in query block 206, a determination is made as to whether the second client is reconnected to the cloud-based file synchronization service. If so, the first client device will then transmit, via the cloud-based file synchronization service, a request to the second client device for the shared state scope file that describes the current state scope of the second client device (block 208).

With reference now to blocks 210 and 212 in FIG. 2, once shared state scope data is received from the second client device, the shared state scope data from the second client device is the stored in the staging area for state scope date storage in the cloud-based file synchronization service.

In one embodiment, a conflict may arise when state scope data is shared (i.e., shared state scope data conflicts with an application running in multiple devices). When a conflict is detected, the conflicting changes to the shared scope data are then placed into a conflict file within a lock file in the staging area. That is, the conflicting changes include a first change from the first client device and a second change from the second client device. In one embodiment, in response to detecting a signal from the first client device indicating that the first client device has authorized an abandonment of the first change, the second change is transmitted to the first client device from the conflict file in the lock file. Thereafter, in response to the second change being transmitted to the first client device, the lock file is deleted.

In one embodiment, it may not be necessary to share the state scope data with another device. For example, assume that the first device is merely changing a screen saver or a background picture. In this example, there is no need to share this change with the second device, since it does not affect the shared state scope of the two devices. Thus, scope data describing the change to the screen saver/background picture is transmitted to the cloud-based file synchronization service, but is not shared with other devices, even when such other devices reconnect to the cloud-based file synchronization service.

As described in block 214, the shared state scope data of the second device is transmitted from the staging area to the first client device. In this way, the two devices both possess the same state scope data. For example, one device is able to communicate with a second device in order to ensure that both devices, which are running the same application, software, etc., have the same state scope data. The process ends at termination block 216.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method for utilizing a cloud-based file synchronization service to share state scope data among client devices, the method comprising:

providing, by one or more processors, a staging area for a state scope data store, wherein the state scope data store resides within a cloud-based file synchronization service that supports storage of a shared state scope data file of a first client device and a second client device, wherein the shared state scope data file describes data entries into a shared application that is running on both the first client device and the second client device, wherein the staging area is partitioned to segregate state scope data that is device-specific from state scope data that is application-specific;

receiving, by one or more processors, a request from the first client device to access the shared state scope data file from the cloud-based file synchronization service, wherein the second client device is disconnected from the cloud-based file synchronization service when the request is received;

in response to one or more processors detecting that the second client device is reconnected to the cloud-based file synchronization service, transmitting, by one or more processors, a request to the second client device for the shared state scope file of the second client device;

receiving, by one or more processors, the shared state scope data file for the second client device;

storing, by one or more processors, the shared state scope data file for the second client device in the staging area for the state scope data store;

in response to one or more processors receiving and storing the shared state scope data file for the second client device, transmitting, by one or more processors, the shared state scope data file for the second client device from the staging area to the first client device;

in response to one or more processors detecting that the first client device and the second client device are concurrently attempting to make conflicting changes to the shared state scope data file, placing, by one or more processors, the conflicting changes into a conflict file within a lock file in the staging area, wherein the conflicting changes comprise a first change from the first client device and a second change from the second client device;

in response to one or more processors detecting a signal from the first client device indicating that the first client device has authorized an abandonment of the first change, transmitting, by one or more processors, the second change to the first client device from the conflict file in the lock file;

in response to the second change being transmitted to the first client device, deleting, by one or more processors, the lock file;

receiving, by one or more processors, a first data from the first client device, determining, by one or more processors, whether the first data from the first client device affects a shared state scope of the first client device and the second client device; and in response to one or more processors determining that the first data from the first client device does not affect the shared state scope of the first client device and the second client device, blocking, by one or more processors, storage of the first data in the staging area, wherein blocked data from the first client device is only stored in the first client device.

2. A computer system comprising:

a processor, a computer readable memory, and a computer readable storage medium;

first program instructions to provide a staging area for a state scope data store, wherein the state scope data store resides within a cloud-based file synchronization service that supports storage of a shared state scope data file of a first client device and a second client device, wherein the shared state scope data file describes data entries into a shared application that is running on both the first client device and the second client device, wherein the staging area is partitioned to segregate state scope data that is device-specific from state scope data that is application-specific;

second program instructions to receive a request from the first client device to access the shared state scope data file from the cloud-based file synchronization service, wherein the second client device is disconnected from the cloud-based file synchronization service when the request is received;

third program instructions to, in response to detecting that the second client device is reconnected to the cloud-based file synchronization service, transmit a request to the second client device for the shared state scope file of the second client device;

fourth program instructions to receive the shared state scope data file for the second client device;

fifth program instructions to store the shared state scope data file for the second client device in the staging area for the state scope data store; and sixth program instructions to, in response to receiving and storing the shared state scope data file for the second client device, transmit the shared state scope data file for the second client device from the staging area to the first client device;

seventh program instructions to, in response to detecting that the first client device and the second client device are concurrently attempting to make conflicting changes to the shared state scope data file, place the conflicting changes into a conflict file within a lock file in the staging area, wherein the conflicting changes comprise a first change from the first client device and a second change from the second client device;

eighth program instructions to, in response to detecting a signal from the first client device indicating that the first client device has authorized an abandonment of the first change, transmit the second change to the first client device from the conflict file in the lock file;

ninth program instructions to, in response to the second change being transmitted to the first client device, delete the lock file;

tenth program instructions to receive a first data from the first client device, eleventh program instructions to determine whether the first data from the first client device affects a shared state scope of the first client device and the second client device; and twelfth program instructions to, in response to determining that the first data from the first client device does not affect the shared state scope of the first client device and the second client device, block storage of the first data in the staging area, wherein blocked data from the first client device is only stored in the first client device; and wherein said first, second, third, fourth, fifth, sixth, seventh, eighth, ninth, tenth, eleventh, and twelfth program instructions are stored on said computer readable storage medium for execution by said processor via said computer readable memory.

* * * * *